O. N. TERRY.
GREASE CUP.
APPLICATION FILED NOV. 1, 1907.

989,311.

Patented Apr. 11, 1911.

WITNESSES:
Edythe M. Anderson.
Florence H. Lovell.

INVENTOR
Otis N. Terry
BY
Sheridan and Wilkinson
ATTORNEY

UNITED STATES PATENT OFFICE.

OTIS N. TERRY, OF LINCOLN, NEBRASKA, ASSIGNOR OF ONE-HALF TO ROBERT D. SMITH, OF BOSTON, MASSACHUSETTS.

GREASE-CUP.

989,311. Specification of Letters Patent. Patented Apr. 11, 1911.

Application filed November 1, 1907. Serial No. 400,150.

*To all whom it may concern:*

Be it known that I, OTIS N. TERRY, a citizen of the United States, residing at Lincoln, in the county of Lancaster and State of Nebraska, have invented certain new and useful Improvements in Grease-Cups, of which the following is a specification.

The object of my invention is to prevent the loss of grease plugs from the cups used upon locomotive engines, and especially upon the connecting rods and parallel rods thereof.

Figure 1:
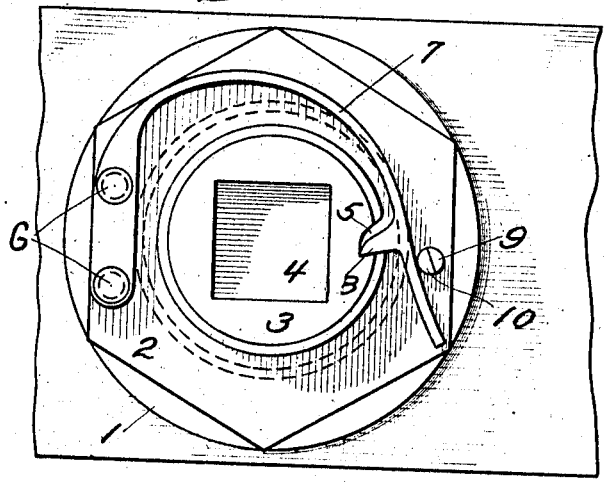
Figure 2:
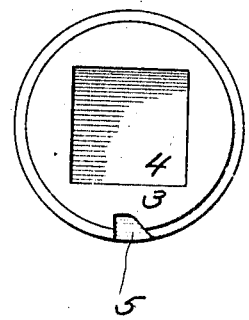
Figure 3:
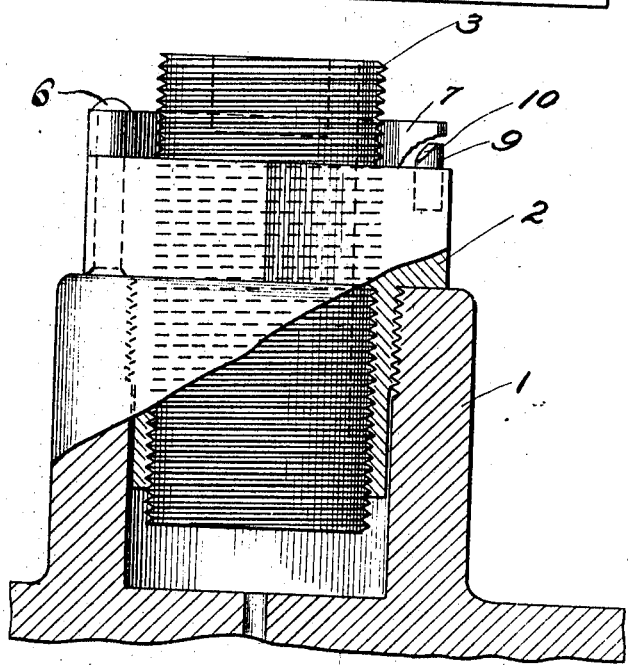
Figure 4:
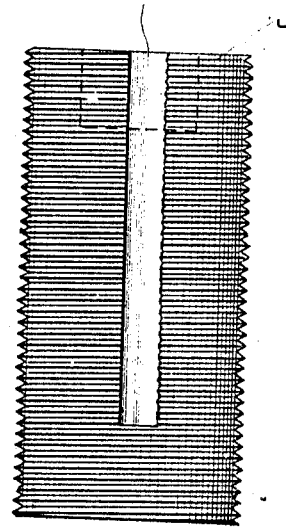

In the drawings—Figure 1 is a plan view showing one form of a grease cup constructed according to my invention. Fig. 2 is a plan view of the plug detached from the cup. Fig. 3 is an elevation view partly in section. Fig. 4 is a side view of the plug, showing the locking groove therein.

It has been the custom heretofore to secure grease plugs in position by means of jam nuts, but the working loose of the jam nuts has permitted the plugs to work out of the bushings in which they are threaded, thus leading to frequent loss. The object of my invention is to obviate this difficulty.

The body 1 of the grease cup is in the present instance formed integral with the connecting rod, or other part, to which it is applied. Screw threaded into the cup 1 is a bushing 2, and threaded into the interior of the bushing 2 is the grease plug 3, provided at its top with a rectangular socket 4, or other means, whereby it may be rotated. The bushing 2 is permanently fitted to the body of the grease cup 1 by means of the screw threads illustrated, and is provided for the purpose of avoiding wear upon screw threads forming part of the main body of the grease cup. My invention, however, is equally applicable whether or not such bushing be employed. The grease plug 3 is provided with a groove 5 extending from the top thereof to a point near the bottom, the lower part of the plug having an uninterrupted screw threaded surface. The length of the bushing 2 and of the groove 5 are so proportioned that the lower end of the groove 5 will not extend below the lower end of the bushing when the plug is in its innermost position, the parts being proportioned in this manner for the purpose of preventing escape of grease through the groove.

Secured to the top of the bushing 2 by rivets 6, or other suitable means, is a spring detent 7, provided with a tooth 8 adapted to engage the groove 5. This spring is preferably arranged as illustrated in Fig. 1, extending around about half the circumference of the plug 3. The tension of the spring normally holds the tooth 8 in the groove 5. One face of the groove 5 and the co-acting face of the tooth 8 are preferably inclined in order to permit the inward rotation of the plug. The opposite faces of the groove and tooth are straight and lie in such a plane as to prevent the rotation of the plug in the opposite or outward direction. In order to facilitate the removal of the plug I provide a stud 9 projecting from the upper surface of the bushing 2 adjacent the free end of the spring 7. This stud is preferably beveled upon its inner surface—as shown at 10—in order to permit the spring 7 to slide freely thereover when thrust outwardly. The outer face of the stud 9 is perpendicular to the upper surface of the bushing 2 and serves to hold the tooth 8 of the spring out of engagement with the notch 5 when the spring is moved to its outer position. When it is desired to move the plug 3 outwardly the spring 7 may be lifted over the stud 9, in which position it will remain with the tooth out of engagement with the notch 5. The plug can then be unscrewed to any desired extent, or withdrawn completely for the purpose of filling the grease cup. Owing to the form of the tooth 8 and groove 5 the plug can be screwed inwardly without disengaging the tooth 8 from said groove.

While I have described a form of grease cup embodying my invention, it is apparent that the invention may be applied in other specific forms and is not restricted to the particular mechanisms herein illustrated.

What I claim is—

1. A grease cup, a notched plug screw threaded therein, a spring secured at one end to said grease cup and having a part normally engaging the notch in said plug, and a stud upon said cup in proximity to the free end of said spring.

2. A grease cup, a notched plug screw-threaded therein, a spring secured at one end to said grease cup and having a part normally engaging the notch in said plug, and a stud upon said cup in proximity to the free end of said spring, said stud having a beveled surface adjacent to said spring whereby said spring may be easily moved over said stud out of engagement with said notched plug.

3. A grease cup, a bushing screw threaded therein, a plug screw threaded in said bushing, said plug being provided with a groove extending endwise of its threaded surface, a spring detent adapted to engage said groove, the proportions of the parts being such that when the plug is in its innermost position the inner end of the groove therein will be above the inner end of said bushing.

OTIS N. TERRY.

Witnesses:
K. E. CULBERTSON,
RUBY FITZGERALD.